United States Patent
Bernazani (10) Patent No.: US 11,788,627 B1
(45) Date of Patent: Oct. 17, 2023

(54) SEAL ARRANGEMENT AND UNDERSEA HIGH-PRESSURE SHAFT SEAL CARTRIDGE FOR UNDERWATER VEHICLES

(71) Applicant: BAE Systems Information and Electronic Systems Intregration Inc., Nashua, NH (US)

(72) Inventor: Michael Jo Bernazani, Chelmsford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 391 days.

(21) Appl. No.: 16/883,357

(22) Filed: May 26, 2020

Related U.S. Application Data (60) Provisional application No. 62/852,753, filed on May 24, 2019.

(51) Int. Cl.
*F16J 15/3268* (2016.01)
*F16J 15/00* (2006.01)
*F16J 15/3212* (2016.01)

(52) U.S. Cl.
CPC ......... *F16J 15/3268* (2013.01); *F16J 15/002* (2013.01); *F16J 15/3212* (2013.01)

(58) Field of Classification Search
CPC .... F16J 15/002; F16J 15/3212; F16J 15/3216; F16J 15/3252; F16J 15/3268; F16C 33/78; F16C 33/783; F16C 33/7886; F16C 33/7896

See application file for complete search history.

(56) References Cited

U.S. PATENT DOCUMENTS

| 2,707,135 | A | * | 4/1955 | Monahan | F16J 15/56 384/139 |
| 3,295,898 | A | * | 1/1967 | Finzel | F04D 29/126 384/537 |
| 4,443,015 | A | * | 4/1984 | Duffee | F16J 15/54 277/374 |
| 4,482,194 | A | * | 11/1984 | Chambers, Sr. | F16J 15/3456 384/480 |
| 4,890,937 | A | * | 1/1990 | Balsells | F16C 27/02 384/32 |
| 5,235,930 | A | | 8/1993 | Pendleton | |
| 6,161,838 | A | * | 12/2000 | Balsells | F16J 15/3212 277/572 |
| 8,539,898 | B1 | | 9/2013 | Sylvia et al. | |
| 9,188,162 | B2 | * | 11/2015 | Kattenberg | F16C 35/045 |
| 9,574,610 | B2 | * | 2/2017 | Kice | F16C 35/045 |
| 10,106,237 | B2 | * | 10/2018 | Kaiser | H02K 5/1732 |
| 2002/0153664 | A1 | * | 10/2002 | Schroeder | F16J 15/56 277/551 |
| 2013/0323061 | A1 | * | 12/2013 | Jacquemont | F16J 15/061 416/174 |
| 2015/0098668 | A1 | * | 4/2015 | Kattenberg | F16C 35/045 29/898.04 |

(Continued)

*Primary Examiner* — Nicholas L Foster
(74) *Attorney, Agent, or Firm* — Scott J. Asmus (57) ABSTRACT

A sealing arrangement having at least two seals for providing a sealing force against a rotating shaft in underwater applications. A replaceable fin assembly comprising a cartridge and a control fin for manned and unmanned underwater vehicles having the sealing arrangement.

16 Claims, 7 Drawing Sheets

(56) References Cited

U.S. PATENT DOCUMENTS

2016/0040721 A1* 2/2016 Kice .................. F16C 33/7896
384/480
2017/0113773 A1* 4/2017 Kaiser .................... B63H 21/17
2017/0369137 A1 12/2017 Smith et al.

* cited by examiner

SEAL ARRANGEMENT AND UNDERSEA HIGH-PRESSURE SHAFT SEAL CARTRIDGE FOR UNDERWATER VEHICLES

CROSS REFERENCE TO RELATED APPLICATIONS

This Application claims the benefit of U.S. Application Ser. No. 62/852,753 filed May 24, 2019, the contents of which are incorporated herein by reference for all purposes

FIELD OF TECHNOLOGY

The following relates to a seal arrangement and an underwater high-pressure shaft seal cartridge for underwater vehicles, and to underwater vehicles having a high-pressure shaft seal cartridge.

BACKGROUND

Underwater Vehicles can be used for a variety of commercial and research applications as well as military applications. One or more control fins are rotated by a motor to control a direction of travel through the water at various depths under the water. Seals are needed to prevent water from entering a hull of the underwater vehicle. Conventional designs include a single sealing element that seals against the rotating control fin. Under high pressures, the single sealing element squeezes the rotating shaft, which increases a torque required to rotate the control fin and adds additional work for the motor of the underwater vehicle.

SUMMARY

An aspect relates to a depth seal arrangement for providing a seal between a rotating shaft and an underwater vehicle housing, comprising: a first high-pressure seal configured to seal against the rotating shaft at a first location along the rotating shaft, and a second high-pressure seal directly adjacent the first high-pressure seal and configured to seal against the rotating shaft at a second location along the rotating shaft adjacent to the first location.

Another aspect relates to an undersea high-pressure cartridge comprising: a main body having a first end, a second end, and a central opening extending from the first end to the second end, the central opening configured to receive a rotating shaft, and a seal arrangement disposed proximate the first end of the main body, the seal arrangement including two high-pressure seals stacked on each other and configured to seal against the rotating shaft.

Another aspect relates to an underwater vehicle comprising: a hull having a nose and a tail, a propulsion mechanism, and an undersea high-pressure cartridge inserted into the hull, the undersea high-pressure cartridge comprising at least two seals that combine to create a pressure differential seal for preventing leaks within the hull, while taking increasing pressure during a dive of the underwater vehicle and reduced pressure during an ascent of the UUV.

Another aspect relates to a control fin assembly comprising: an undersea high-pressure cartridge inserted into a hull, the undersea high-pressure cartridge comprising at least two seals that combine to create a pressure differential seal for preventing leaks within the hull, a control fin having a shaft that passes through the undersea high-pressure cartridge, and a motor mechanically coupled to the shaft for causing a rotation or movement of the control fin.

Another aspect relates to a method for providing a seal between a rotating shaft, comprising: arranging two high-pressure seals stacked on each other around a rotating shaft of an underwater vehicle to create a differential pressure seal configuration that seals against at least the rotating shaft.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
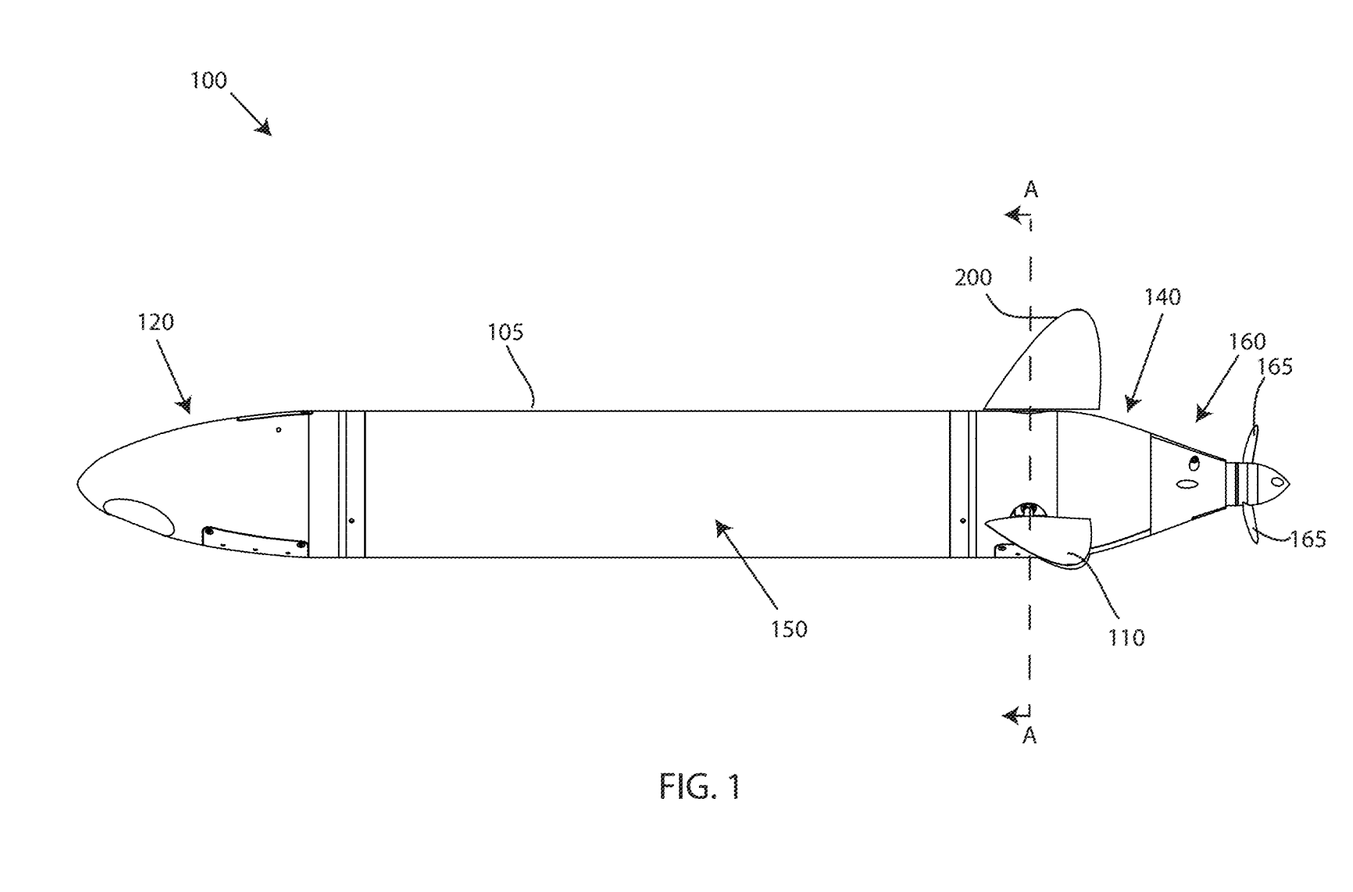
FIG. 1 depicts a side view of an underwater vehicle, in accordance with embodiments of the present disclosure.

Referring to the drawings, FIG. 1 depicts an embodiment of an underwater vehicle 100. The term underwater vehicle 100 is any manned or unmanned vehicle that is designed to dive below the surface of a body of water. Examples of underwater vehicle 100 include unmanned autonomous vehicles (UUV), autonomous underwater vehicles (AUV), remotely operated vehicle (ROV), autonomous remotely operated vehicle (AROV), large displacement unmanned undersea vehicles (LD UUV), submarines, and the like. For clarity, the term underwater vehicle will be used throughout the description. The underwater vehicle 100 may function autonomously, manned, unmanned, or remotely controlled, for example, by cable controls, for operations below a surface of a body of water, such as a lake, river, sea, ocean, etc. Various operations of the underwater vehicle 100 include but are not limited to mapping ocean floors, investigating objects located undersea, reconnaissance, underwater transportation, imaging, mine countermeasures, object detection, oil and gas undersea exploration, underwater surveying, ocean research, academic research, underwater package or payload delivery, military missions, undersea communications, intelligence operations, and the like.

The underwater vehicle 100 includes a first end 120, a second end 140, a hull 150 and a propulsion mechanism 160. In an operable position, such as a fully assembled position capable of underwater application, the underwater vehicle 100 has an outer surface 105. The outer surface 105 is a continuous or uniform surface comprising an external surface or outer body portion of the underwater vehicle 100. The underwater vehicle 100 further includes a plurality of fins 110. The fins 110 are used to control a movement or movement direction, angle, etc. The fins 110 may be a fin (e.g. control fin) or a rudder. The propulsion mechanism 160 propels the underwater vehicle 100 through the water. In an exemplary embodiment, the propulsion mechanism 160 is comprised of a plurality of propellers 165.

The underwater vehicle 100 optionally includes a plurality of sensors, cameras, communications hardware, lights, gauges, hardware, interfaces, and the like. For instance, embodiments of the underwater vehicle 100 may include an altimeter (e.g. 300 foot altimeter), a pressure sensor (e.g. 30 Bar Pressure Sensor), a temperature sensor, one or more IR LED strobes, white LED strobes, WiFi capability, and GPS technology. Moreover, the underwater vehicle 100 optionally includes a plurality of hardware and interfaces, such as an inertial measurement unit (IMU), an altimeter, a pressure sensor, an OLED display, an autonomy controller, payload, power controller, a plurality of servo motors, a tail controller, a GPS antenna, a Wi-Fi chip, a plurality of LED's, an ESC, and a motor.

The underwater vehicle 100 can be powered by different energy sources. In an exemplary embodiment, the underwater vehicle 100 is powered by one or more batteries located onboard the underwater vehicle 100. The power source for the underwater vehicle 100 can include one or more battery modules located within an interior region of the hull 150, wherein each battery module includes a plurality of removable batteries (e.g. AA, AAA, C, D batteries) inserted into cavities of the battery module. The various energy sources include alkaline, lithium ion (rechargeable), lithium ion (primary), Nickel metal hydride (NiMH) (rechargeable), Nickel Cadmium (NiCad) (rechargeable) an Aluminum Sea Water battery or other fuel cell embodiments, a nuclear reactor, or other propulsion sources. Other conventional power sources can be used to power the underwater vehicle 100.

Furthermore, the underwater vehicle 100 includes a computing system. The computing system is a computer having at least one processor, located onboard the underwater vehicle 100. The computing system of the underwater vehicle 100 requires software and may utilize proprietary or open source software for application and programming These software applications interface to the hardware devices of the underwater vehicle 100 through a nose controller, power controller, and/or tail controller using appropriate communications protocol (e.g. via I2C).

Figure 2:
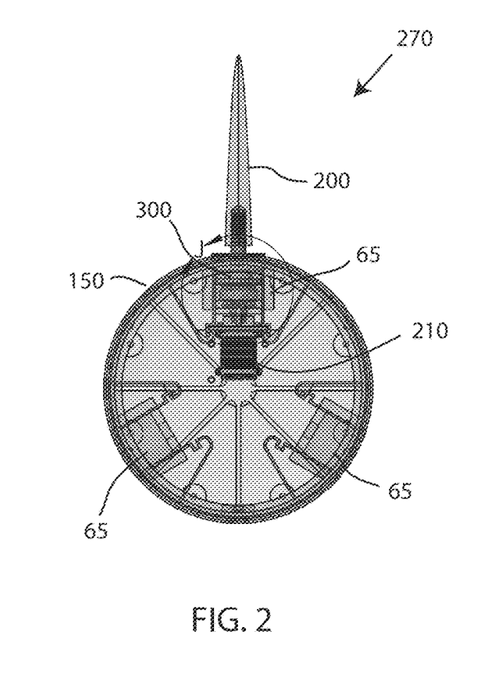
FIG. 2 depicts a cross-section of the underwater vehicle shown in FIG. 1, along line A-A, in accordance with embodiments of the present disclosure.
Figure 3:
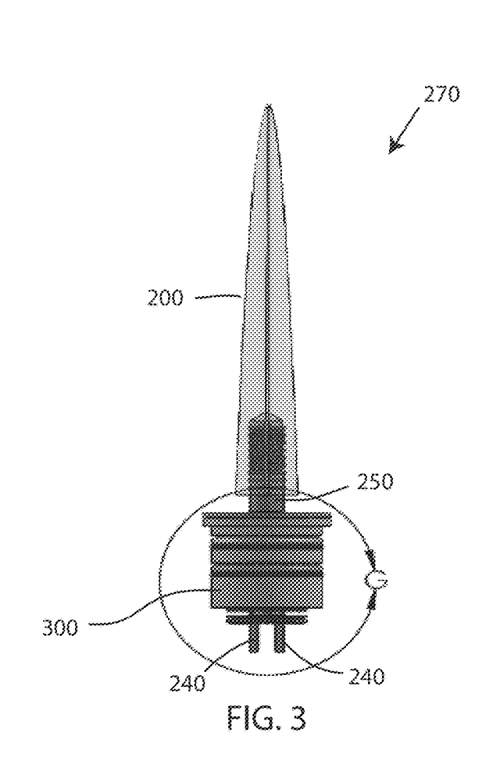
FIG. 3 depicts a fin assembly, in accordance with embodiments of the present disclosure.

Referring now to FIG. 2, the underwater vehicle 100 includes at least one control fin 200. FIG. 2 depicts a cross-section of the underwater vehicle 100 shown in FIG. 1, along line A-A, in accordance with embodiments of the present disclosure. The hull 150 includes one or more openings 65 for receiving a fin assembly 270. The opening 65 is a hole or access point in an exterior surface of the hull 150. In an operable configuration, the fin assembly 270 is insertable into the opening 65. Each opening 65 can receive a fin assembly 270 to create an operable dorsal fin and two operable lateral fins of the underwater vehicle 100. The fin assembly 270 includes a control fin 200 (e.g. dorsal and lateral fins), an undersea high-pressure cartridge 300, and a motor 210. A portion of the fin assembly 270 extends within an interior of the hull 150. FIG. 3 depicts the fin assembly 270, in accordance with embodiments of the present disclosure. The control 200 includes a shaft 250 that is inserted into the undersea high-pressure cartridge 300. One end of the shaft 250 includes the control fin 200 which is attached to the shaft 250 by epoxy or other adhesive material. Alternatively, the control fin 200 is structurally integral with the shaft 250. The shaft 250 is a high tolerance machined round shaft that distributes rotational force from the motor 210 (shown in FIG. 2) to the external fins 200, which steer the vehicle. In an exemplary embodiment, the shaft 250 includes a knurled top section to allow for better epoxy adhesion to the polyurethane fin. The other end of the shaft 250 is inserted into the undersea high-pressure cartridge 300 and mechanically coupled to the motor 210 (shown in FIG. 2) to translate rotation from the motor. For example, the opposite end of the shaft 250 may be machined into two forks 240 which translate rotation from the motor 210 and motor hub. Two through-holes are drilled offset from a centerline and countersunk to position thrust transfer pins 285 which are sandwiched between two thrust washers 280a, 280b (shown in FIG. 4). The through-hole countersinks aid in protecting the integrity of the seal inner diameters (i.e. located in the cartridge 300) during the assembly process. Nicks or scratches on the sealing surfaces pose likely failure at high pressures. The extreme tolerance control needed for diameter size and concentricity of the shaft 250 is vital to the proper fit up with the seals and bearings, which are also tightly toleranced. Any runout experienced by the seals 410, 420 (shown in FIG. 6) due to improper size or concentricity of the shaft 250 or the shaft's fit with the bearings and seals will force the seal into an out of round condition, causing failure. Other connection arrangements can be used to couple the shaft 250 to the motor 210.

Figure 4:
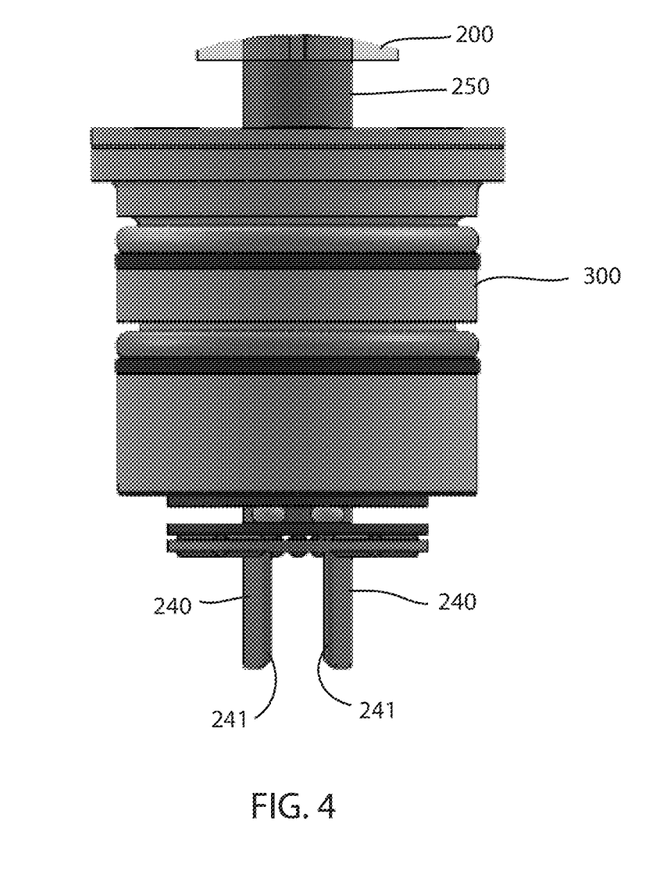
FIG. 4 depicts an enlarged view of the fin assembly, in accordance with embodiments of the present disclosure.

FIG. 4 depicts an enlarged view of the fin assembly 270, in accordance with embodiments of the present system. The end of the shaft 250 that couples to the motor 210 includes one or more forks 240 that mate with receptacles of the motor 210. The forks 240 extend from the end of the shaft 250 to mate with the motor 210, such that the fins 200 are rotated by the force applied to the shaft 250 originated from the motor 210.

Figure 5:
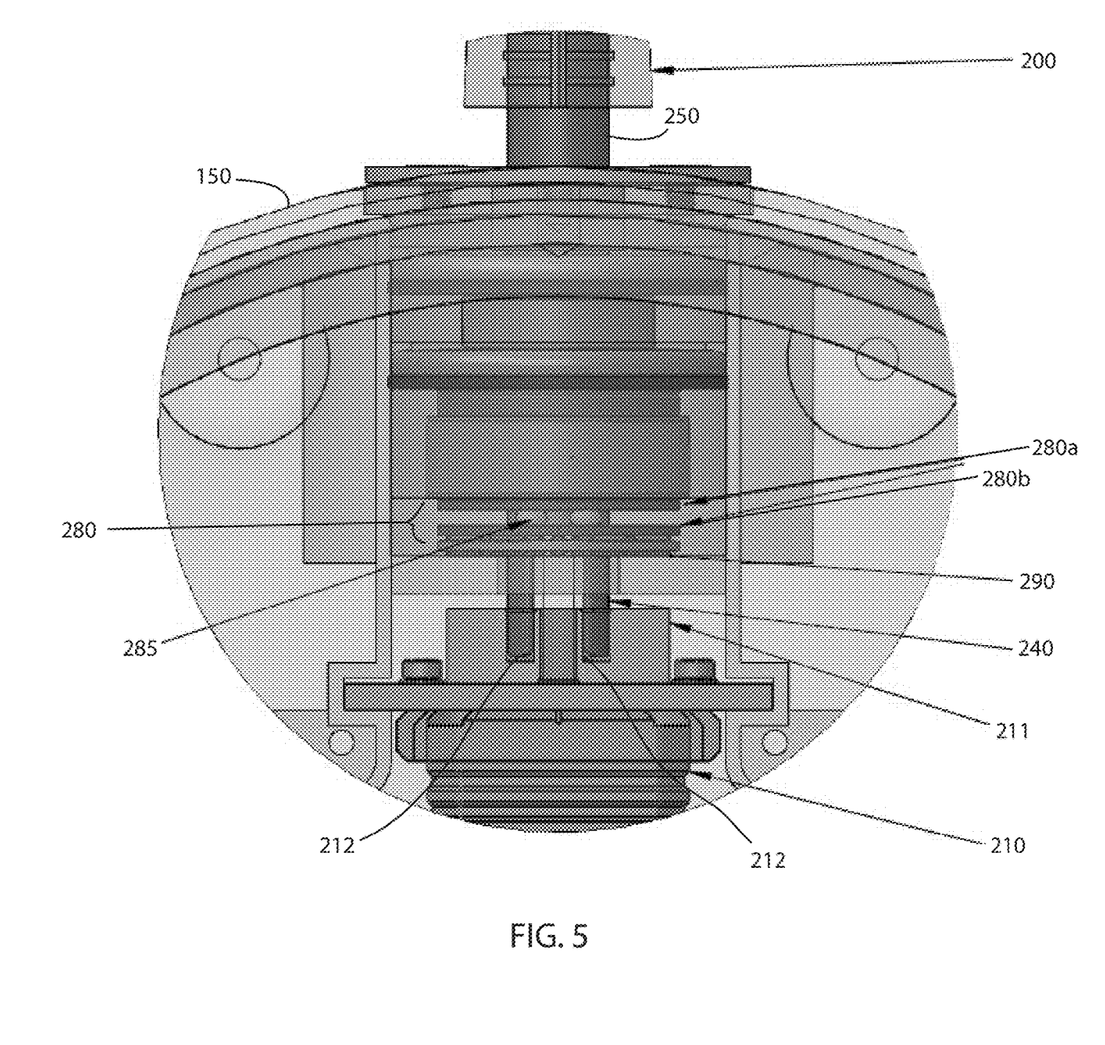
FIG. 5 depicts a detailed view of the connection between the control fin and a motor, in accordance with embodiments of the present disclosure.

The mating between the forks 240 of the shaft 250 and the motor 210 is shown in more detail in FIG. 5. The forks 240 extend into receptacles of a hub 211 of the motor 210 and are mechanically coupled such that torque generated by the motor 210 is transferred to the shaft 250 of the control fin 200.

The motor 210, such as a servo motor, is used to effectuate a rotation of the control fin 200 to control a travel direction of the underwater vehicle 100. For example, a servo motor supplies radial force through a keyed connection to the servo hub 211 to the shaft forks 240, which turns the fin at the top of the fin assembly 270. The hub 211 is dimensioned in conjunction with a thrust bearing assembly 290 to contact and drive sides or faces of the fin shaft forks 240, while not allowing the fin shaft fork bottoms to make axial contact. This arrangement keeps the servo stress free from axial forces generated by deep water pressure, and allows the servo to provide consistent maximum torque, while extending its operating life. In an exemplary embodiment, the rods or forks 240 include faces 241 that engage with corresponding faces 212 in the hub 211 of the motor 210. Mechanical engagement between the faces 241, 212 permits force transfer between the motor 210 and the control fin 210. Other known configurations can be used to effectuate a transfer of forces generated by the motor 210 to a mechanical component or armature of the shaft 250.

Additionally, the fin assembly 270 includes a thrust washer assembly 280 between the undersea high-pressure cartridge 300 and the motor 210. The thrust washer assembly 280 distributes axial force (i.e. thrust) from downward pressure on the control fin 200 and the shaft 250 into thrust transfer clip or thrust transfer pins 285. While thrust transfer pins 285 are depicted, in one example the system uses a circular retaining clip. The thrust washer assembly 280 includes a top thrust washer 280a, a bottom thrust washer 280b, and the thrust transfer pins 285 sandwiched between the top thrust washer 280a and the bottom thrust washer 280b to evenly distribute forces from the top and bottom washers 280a, 280b, respectively. The top thrust washer 280a is custom-sized to ride on an inside hub of a radial shaft bearing located above the top thrust washer 280a to prevent contact with any other part of the radial shaft bearing race or shield. As a result, friction does not occur between the top thrust washer 280a and the radial shaft bearing. The bottom thrust washer 280b receives force from the thrust transfer pins 285, and re-directs the force into the tail housing of the underwater vehicle 100, which is designed to further distribute the force. Further, the control fin assembly 270 includes a thrust bearing 290. The thrust bearing 290 distributes the axial force generated by pressure to cylindrical roller bearings in a circular pattern as the fin shaft 250 rotates. The force is then transferred into the tail housing bore which eliminates any force on the servo face. Accordingly, the thrust washer assembly 280 and the thrust bearing 290 keep high axial pressure from arresting or damaging the motor 210.

Figure 6:
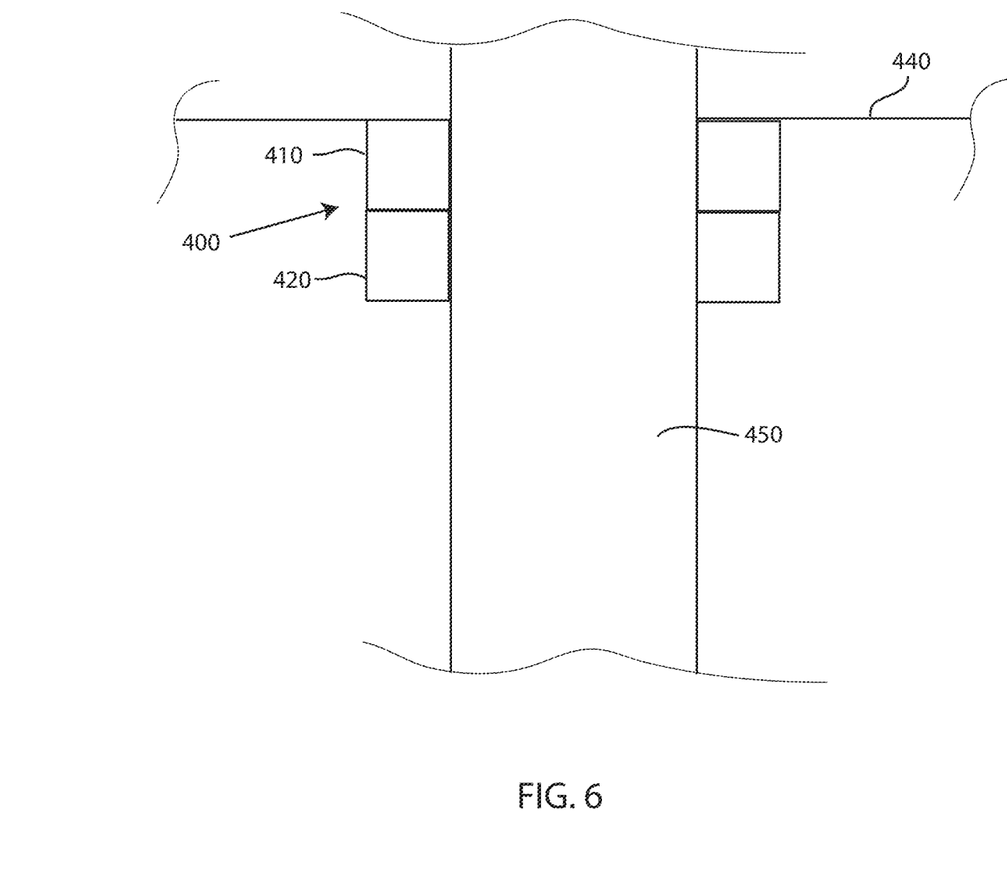
FIG. 6 depicts a schematic view of the seal arrangement, in accordance with embodiments of the present disclosure.

Turning now to FIG. 6, embodiments of the present disclosure include a depth seal arrangement 400 for underwater vehicles. FIG. 6 depicts a schematic view of the depth seal arrangement 400, in accordance with embodiments of the present disclosure. The seal arrangement 400 provides a seal between a rotating shaft 450 and at least one surface of an underwater vehicle housing 440. The rotating shaft 450 is a mechanical component that includes a fin on one end and connected to a motor at the other end. In an exemplary embodiment, the rotating shaft 450 shown in FIG. 6 is the shaft 250 described above. In other words, the rotating shaft 450 may be a fin shaft of an underwater vehicle, such as underwater vehicle 100. The housing 440 is comprised of a surface of the underwater vehicle 100 or other underwater vehicle, such as hull exterior surface, that is contact with water during operation. The seal arrangement 400 includes a first high-pressure seal 410 and a second high-pressure seal 420 directly adjacent to the first high-pressure seal 410. In an exemplary embodiment, the two seals 410, 420 are in a stacked configuration, such that the first seal 410 (e.g. top seal) is stacked on the second seal 420 making direct, continuous contact with the second seal 420. The first seal 410 is configured to seal against the rotating shaft 450 at a first location along the rotating shaft 450, while the second seal 420 is configured to seal against the rotating shaft 450 at a second location along the rotating shaft 450. The first location and the second location of the seal formed against the rotating shaft 450 are next to each other with no or minimal circumferential gap therebetween. Optionally, the seal arrangement 400 could have more than two seals that are in a stacked configuration as described herein.

An alternative seal arrangement could include additional high-pressure seals stacked against each other as shown in FIG. 6. For instance, the seal arrangement could optionally includes a third high-pressure seal, a fourth-high-pressure seal, and nth high-pressure seal directly adjacent to the neighboring high-pressure seal surrounding the shaft 250.

Moreover, the first seal 410 is comprised of a different material than a material of the second seal 420. In an exemplary embodiment, the first seal 410 is polyimide filled polytetrafluoroethylene (PTFE), and the second seal 420 is ultra-high molecular polyethylene.

Due to the seal arrangement 400, a pressure differential is created between the first high-pressure seal 410 and the second high-pressure seal 420 as the underwater vehicle descends to larger depths below the surface of the water. The two high pressure seals 410, 420 combine to create a differential pressure seal, preventing leaks, while taking increasing pressure during dive, and reduced pressure during ascent. For instance, a pressure differential builds up between the seals 410, 420 until the pressure equalizes between the seals 410, 420 as the pressure increases at greater depths, which results in a pressure drop across both seals 410, 420 so that neither seal 410, 420 is exposed to the full pressure at various depths below the surface of the water. By way of example, if the underwater vehicle is at a depth where the full pressure is 2292 psi, the pressure load will be distributed evenly between the first seal 410 and the second seal 420. In this example, the first seal 410 experiences 1146 psi of pressure and the second seal 420 experiences 1146 psi of pressure.

In a single seal configuration, the single sealing element experiences the full pressure causing the single seal to squeeze the rotating shaft 450 at a large compression force at along a small axial distance along the shaft (i.e. thickness/height of the single seal). The squeezing of the shaft by the single seal forces the motor to perform more work to generate additional torque to overcome the compressive squeezing force so that a control fin can rotate. In some cases, the additional work performed by the motor leads to motor failure or faster depletion of power from the onboard power sources. In contrast, the seal arrangement 400 reduces the squeezing effect of the seals 410, 420 against the rotating shaft 450 because the compression force is much less due to the reduced pressure load experienced by each seal 410, 420. Further, the compression force resulting from potential squeezing will be spread across a larger axial distance along the shaft 450. As a result, the motor 210 is less likely to need to perform more work to output a higher torque.

The seals 410, 420 can be a high-pressure lip seal having a pre-loaded spring configured to apply a sealing force against the rotating shaft 450. The high-pressure lip seal is generally annular member, such as a disk shape, having flat top and bottom surfaces to promote even and continuous contact between the seals, and a central opening or through-hole in a center of the seal to permit the rotating shaft 450 to pass therethrough. A channel is formed into the lip seal from the top surface and extends continuously around the seal. The channel forms two lip faces that oppose each other, such as an inner lip and an outer lip. The outer lip contacts a surface along the outer perimeter of the seal while the inner lip contacts a surface along the inner perimeter of the seal. By way of example, the inner lip of the seal seals against the rotating shaft 450, and the outer lip seals against another surface within a hull of the underwater vehicle. A preloaded spring is disposed circumferentially around and against the inner lip to provide additional compressive sealing force against the rotating shaft 450 to prevent leaks of water into the interior of the hull of an underwater vehicle.

Figures 7, 8:
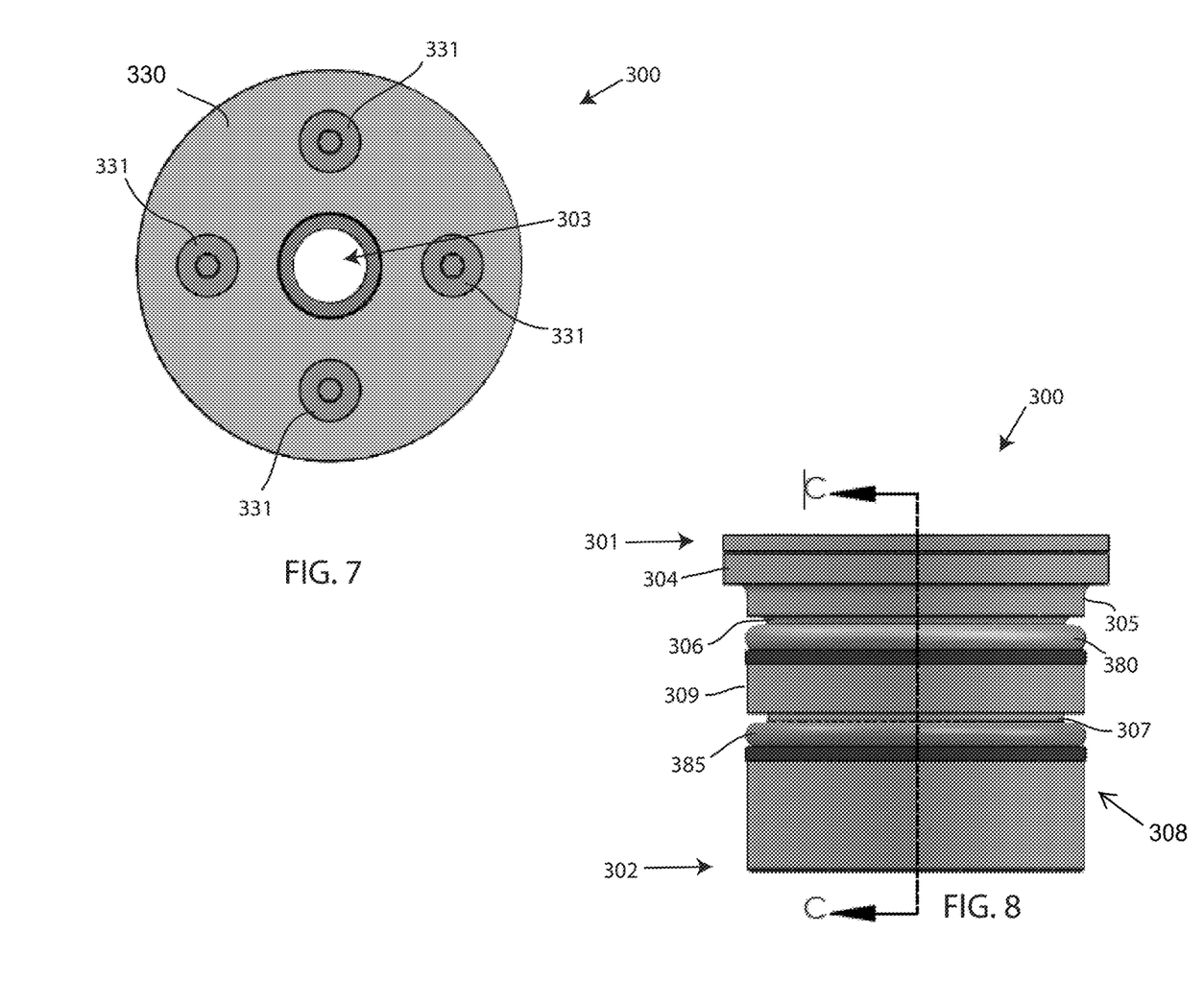
FIG. 7 depicts a top view of an undersea high-pressure cartridge, in accordance with embodiments of the present disclosure.
FIG. 8 depicts a side view of the undersea high-pressure cartridge of FIG. 7, in accordance with embodiments of the present disclosure.
Figure 9:
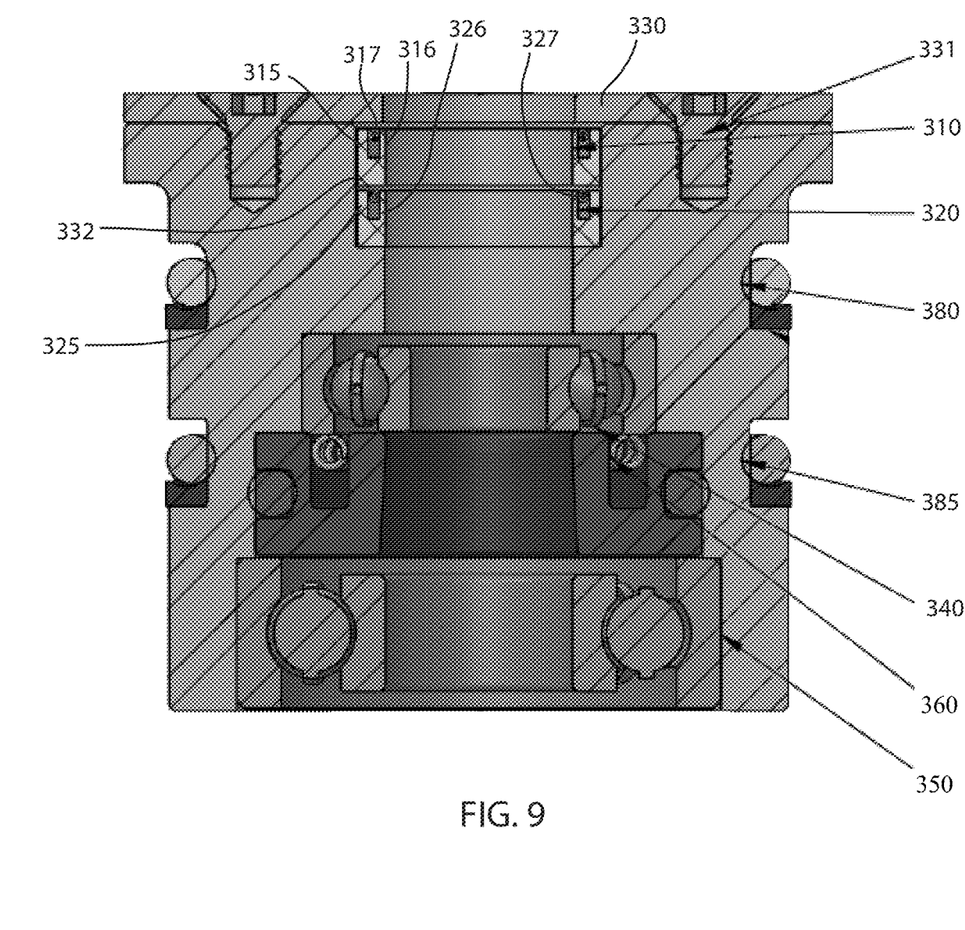
FIG. 9 depicts a cross-sectional view of the undersea high-pressure cartridge of FIG. 8, along line C-C, in accordance with embodiments of the present disclosure.

Referring now to FIGS. 7-9, the undersea high-pressure cartridge 300 of the fin assembly 270 includes a depth seal arrangement as described above. FIG. 7 depicts a top view of the undersea high-pressure cartridge 300, FIG. 8 depicts a side view of the undersea high-pressure cartridge 300, and FIG. 9 depicts a cross-sectional view of the undersea high-pressure cartridge 300 along line C-C in FIG. 8, in accordance with embodiments of the present disclosure.

In one example the system provides a user replacement unit having a fin and cartridge that is easy to install and minimizes damage to the fin. The cartridge 300 is a single unit removable assembly that provides for an internal dry operation of the external steering fins in a multiple (e.g.: 3) servo motor underwater vehicle in fresh water or seawater from 0 meters-1000 meters depth or more. The undersea high-pressure cartridge 300 is designed to provide a seal between a shaft 250 and vehicle housing at high and low pressures by combining radial stability with high and low-pressure spring energized seals. Two outer high-pressure seals 310, 320 combine to create a differential pressure seal, preventing leaks, while taking increasing pressure during dive, reduced pressure during ascent, and reducing shaft rotational torque. In one example the cartridge 300 includes a low pressure seal that provides a backup and emergency seal at lower depths. The cartridge 300 in one example is rated at 1000-meter depth or greater. Further, the cartridge 300 provides dry compartment sealing, stability of the fin shaft during rotation, and force management/transfer to the outer tail housing wall. Further, the cartridge 300 includes a bushing disposed proximate the second end 302 of the main body 308. In an exemplary embodiment, the cartridge is a 1000 M-10 MM tightly toleranced machined housing that provides proper spacing, dimensioning, stress management, and with surface finishes to accommodate the individual components needed for dynamic operation at various depths.

The undersea high-pressure cartridge 300 includes a generally annular main body 308 having a first end 301, a second end 302, and a central opening 303 extending from the first end 301 to the second end 301. The central opening 303 is a bore, through-hole, or the like, that is configured to receive a rotating shaft 250 in an assembled state of the underwater vehicle 100. As shown in FIG. 8, the main body 308 includes a flange 304 that extends radially outward greater than the rest of the main body 308. The flange 304 is located at the first end 301 of the main body 308. A retaining plate 330 is secured to a top surface of the main body 308 proximate the first end 301. In an exemplary embodiment, the retaining plate 330 is secured to the flange 304 by a plurality of fastener members 331, such as screw (e.g. M3X.5×5 MM socket head screw). The retaining plate 330 is configured to securely retain the seal arrangement in place and in a proper orientation, within the cartridge 300. Additionally, the main body 308 includes a first recessed portion 305 that is recessed from the flange 304, a second recessed portion 306 that is recessed from the general exterior surface 309 of the main body 308, and a third recessed portion 307 that is recessed from the exterior surface 309.

The seal arrangement of the cartridge 300 includes a first high-pressure seal 310 and a second high-pressure seal 320 arranged the same or substantially the same way as the seal arrangement 400 described above. The seals 310, 320 are disposed proximate the first end 301 of the main body 308, and are configured to seal against the rotating shaft 250 of the control fin 200 of the underwater vehicle. The seals 310, 320 may be disposed within or partially within a recessed portion within the main body 308. In one example the first seal 310 is a BAL Lip Seal X624015-10 MM that creates the sealing surface at high pressure between the inner wall of the main body 308 and the shaft 250, keeping water out of the tail compartment of the hull, while the shaft 250 rotates at higher pressures. The first seal 310 in this example includes an energized spring 317 that is pre-loaded to produce a sealing force on the shaft 250 at lower pressures. As the pressure and forces build on the seal face due to descent, an inner lip 316 of the first seal 310 begins to take more of the pressure as the inner lip 316 compresses onto the shaft 250, and directs the force from an outer lip 315 onto the inner wall 332 of the main body 308. High pressure force is transferred at the deeper pressures from the first seal 310 to the inner wall 332 of the main body 308 and to the shaft 250, which are both designed to handle higher pressures by their geometry. Further, in one example the first seal 310 is comprised of a different material than the second seal 320; the first seal 310 in one example is a polyimide filled PTFE.

The second seal 320 is substantially similar in structure to the first seal 310, except the second seal 320 is one example made from ultra-high molecular polyethylene. In one example the second seal 320 includes an inner lip 326, an outer lip 325, and an energized spring 327 residing contiguous to the inner lip 326. The second seal 320 in this example is a BAL Lip Seal X624019-10 MM that provides secondary sealing surfaces between the inner wall 332 of the main body 308 and the shaft 250. The second seal 320 contributes a supplemental sealing force while pressure equalizes as the underwater vehicle (e.g. UUV) moves deeper and experiences higher pressures in descent. The ultra-high molecular polyethylene seal continues to contribute sealing force in addition to the Polyimide-filled PTFE adjacent seal, until the pressure is equalized.

With continued reference to FIGS. 7-9, the cartridge 300 includes a first external sealing element 380 and an optional second external sealing element 385. The external sealing element 380 is positioned within the second recessed portion 306 of the main body 308. The external sealing element 380 in one example is a 70 SHORE A Durometer external O-ring that provides a low pressure seal between the external surface 309 of the main body 308 and an outer wall of the UUV tail housing or other housing surface within the interior of the underwater vehicle. The second external sealing element 385 is positioned within the third recessed portion 307 of the main body 308. The second external sealing element 385 in one example is a 90 SHORE A Durometer external O-ring that provides a high pressure seal between the external surface 309 of the main body 308 and an outer wall of the UUV tail housing or other housing surface within the interior of the underwater vehicle. Each of the first external sealing element 380 and the second external sealing element 385 can include a backup sealing ring that keeps the external sealing element from extruding or pinching into the gap between the external surface 309 of the main body 308 and an outer wall of the housing as the sealing elements 380, 385 deform under pressure. The backup rings shown positioned below the external sealing element 380, 385 in the second and third recessed portions, respectively, extend the life and integrity of the external sealing elements 380, 385. In one embodiment, the external sealing element 380 has a hardness as measured by a Shore A durometer of 90 SHORE A and the optional second sealing element 385 is not required. In certain deep applications the external sealing elements 380, 385 are polyurethane.

The cartridge 300 in one example also includes a first radial bearing 340 and a second radial bearing 350 for aligning a center axis of the main body 308 and the rotating shaft 250 with a center axis of a motor configured to rotate the rotating shaft 250. In another example only the first radial bearing is employed. In this example, the first radial shaft bearing 340 provides additional stability and eliminates shaft runout by offering a second point of contact between the rotating shaft 250 and the inner wall 332 of the main body 308, and also helps the seals 310, 320 to stay concentric to the rotating shaft 250 during rotation of the shaft 250. The second radial shaft bearing 350 is the primary bearing that aligns the servo motor with the center axis of the main body 308 and the shaft 250 for stress-free concentric shaft rotation. The function of the second radial shaft bearing 350 in one example extends servo motor life, and increases maximum consistent torque output. The second radial shaft bearing 350 also serves to minimize shaft runout, extending seal life and performance.

Furthermore, the cartridge 300 includes a spring energized seal 360 located between the first radial shaft bearing 340 and the second radial shaft bearing 350. The spring energized seal 360 provides a seal against the main body 308 and the rotating shaft 250 at lower pressures. For instance, the spring energized seal 360 provides a lower pressure shaft seal between the shaft 250 and inner surface 332 of the main body 308 as the vehicle moves from upper surface depth to higher pressures at increased depths. The spring energized seal 360 provides constant pressure on the shaft 250, creating the lower pressure seal, and also serves as an emergency seal if there is unanticipated failure, and allows for vehicle recovery in breach situation or outer seal malfunction. In one embodiment the first and second radial shaft bearings are not required and the volume is solid with a slip fit hole to retain the fin shaft. This latter example eliminates the first and second radial bearings and the related elements by having a solid section and the slip fit hole providing the shaft access to the motor.

The cartridge 300 may be packaged and sold separately from the control fins and the servo motors. For instance, the cartridge 300 can be assembled on-site to include the control fins and the motor. Once assembled, a user can insert the assembly into an opening in the hull. Alternatively, the entire fin assembly, including the control fin inserted into the cartridge 300 and connected to the motor, can be packaged and sold to a user. When the user receives the fin assembly, the user can insert the entire fin assembly into the hull through a hole in the hull. Further, the UUV or underwater vehicle may be assembled with the fin assembly operably attached to the underwater vehicle and sold to the user.

Referring to FIGS. 1-9, a method for providing a seal between a rotating shaft includes the steps of arranging two high-pressure seals stacked on each other around a rotating shaft of an underwater vehicle to create a differential pressure seal configuration that seals against at least the rotating shaft. Another method includes the step of inserting the undersea high-pressure cartridge 300 into an opening 65 in a hull 150 of an unmanned underwater vehicle 100. As a result, a control fin assembly with the cartridge and control fin are inserted into the central opening of the main body of the undersea high-pressure cartridge, and configured to be connected to a servo motor located within the hull of the unmanned underwater vehicle. As an integral unit, the control fin assembly is a field replaceable unit allowing a quick replacement with minimal tooling. In one example the components are manufactured by additive manufacturing.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A cartridge for an underwater vehicle, comprising:
 a main body having a first end, a second end, and a central opening extending from the first end to the second end, the central opening configured to receive a rotating shaft when installed in the underwater vehicle;
 a first high-pressure seal comprising a portion of the central opening for the rotating shaft and configured to seal against the rotating shaft at a first location along the rotating shaft; and
 a second high-pressure seal comprising a portion of the central opening for the rotating shaft and located directly adjacent the first high-pressure seal and configured to seal against the rotating shaft at a second location along the rotating shaft adjacent to the first location, wherein when in use underwater, a pressure differential is created between the first high-pressure seal and the second high-pressure seal based on the depth of the underwater vehicle,
 wherein the first high-pressure seal and the second high-pressure seal apply a compression force that seals against the rotating shaft, such that a pressure load based on the depth of the underwater vehicle is distributed substantially evenly between the first high-pressure seal and the second high-pressure seal, and
 wherein the first high-pressure seal has a first inner lip comprising a first material and the second high-pressure seal has a second inner lip comprising a second material different from the first material and the first inner lip and second inner lip contact an exterior surface of the rotating shaft when installed in the underwater vehicle.

2. The cartridge of claim 1, further comprising at least one radial bearing for aligning a center axis of the main body and the rotating shaft with a center axis of a motor configured to rotate the rotating shaft.

3. The cartridge of claim 1, further comprising a low-pressure seal for providing a seal against the main body and the rotating shaft wherein the low-pressure seal comprises a spring energized seal.

4. The cartridge of claim 1, further comprising a retaining plate secured to a top surface of the main body proximate the first end of the main body.

5. The cartridge of claim 1, wherein the first material comprises polyimide filled polytetrafluoroethylene.

6. The cartridge of claim 1, wherein the second material comprises polyethylene.

7. The cartridge of claim 1, wherein the first high-pressure seal is stacked on the second high-pressure seal.

8. The cartridge of claim 1, wherein each inner lip has a pre-loaded spring configured to apply an additional sealing force against the rotating shaft.

9. The cartridge of claim 1, further comprising at least one external sealing element to provide a seal between the cartridge and a hull of the underwater vehicle.

10. A control fin assembly, comprising:
an undersea high-pressure cartridge insertable into an opening of a hull of an underwater vehicle, the undersea high-pressure cartridge comprising at least two high-pressure seals that combine to create a pressure differential seal for preventing leaks; and
a control fin coupled to a rotating shaft that passes through the undersea high-pressure cartridge, wherein the shaft is configured to be mechanically coupled to a motor of the underwater vehicle that is used to cause a movement of the control fin,
wherein the two high-pressure seals have a central opening configured for the shaft and comprise pre-loaded springs configured to apply a sealing force against the shaft,
wherein a first of the high-pressure seals and a second of the high-pressure seals each apply a compression force that seals against the shaft, such that a pressure load based on a depth of the underwater vehicle is distributed substantially evenly between the first high-pressure seal and the second high-pressure seal,
wherein the first high-pressure seal is configured to seal against the rotating shaft at a first location along the rotating shaft, and the second high-pressure seal is located directly adjacent the first high-pressure seal and is configured to seal against the rotating shaft at a second location along the rotating shaft adjacent to the first location, wherein when in use underwater, the pressure differential is created between the first high-pressure seal and the second high-pressure seal based on the depth of the underwater vehicle, and
wherein the first high-pressure seal has a first inner lip comprising a first material and the second high-pressure seal has a second inner lip comprising a second material different from the first material and the first inner lip and second inner lip contact an exterior surface of the shaft when deployed in the underwater vehicle.

11. The control fin assembly of claim 10, further comprising forks extending from the shaft and engaging a motor that provides for movement of the control fin.

12. The control fin assembly of claim 10, further comprising at least one external sealing element.

13. The control fin assembly of claim 11, further comprising at least one bearing for aligning a center axis of a main body of the cartridge and the rotating shaft with a center axis of the motor.

14. An underwater vehicle comprising:
a hull having a nose and a tail;
a propulsion mechanism; and
a replaceable undersea fin assembly with a high-pressure cartridge insertable into the hull and a control fin having a rotating shaft extending through the high-pressure cartridge that engages a motor of the underwater vehicle, the undersea high-pressure cartridge comprising at least two high-pressure seals that combine to create a pressure differential seal against the shaft for preventing leaks within the hull, while taking increasing pressure during a dive of the underwater vehicle and reduced pressure during an ascent of the underwater vehicle,
wherein the at least two high-pressure seals include a central opening configured for the shaft, and wherein a first of the high-pressure seals and a second of the high-pressure seals each apply a compression force that seals against the shaft, such that a pressure load based on the depth of the underwater vehicle is distributed substantially evenly between the first high-pressure seal and the second high-pressure seal,
wherein the first high-pressure seal is configured to seal against the rotating shaft at a first location along the rotating shaft, and the second high-pressure seal is located directly adjacent the first high-pressure seal and is configured to seal against the rotating shaft at a second location along the rotating shaft adjacent to the first location, wherein when in use underwater, the pressure differential is created between the first high-pressure seal and the second high-pressure seal based on the depth of the underwater vehicle, and
wherein the first high-pressure seal has a first inner lip comprising a first material and the second high-pressure seal has a second inner lip comprising a second material different from the first material and the first inner lip and second inner lip contact an exterior surface of the shaft when deployed in the underwater vehicle.

15. The underwater vehicle of claim 14, wherein the at least two high-pressure seals are stacked together within the undersea high-pressure cartridge.

16. The underwater vehicle of claim 14, wherein the first inner lip is made of polyimide filled polytetrafluoroethylene, and the the second inner lip is made of ultra-high molecular polyethylene.

* * * * *